US012110363B2

(12) United States Patent
Chaplin et al.

(10) Patent No.: US 12,110,363 B2
(45) Date of Patent: Oct. 8, 2024

(54) POLYMERIC MATERIAL, MANUFACTURE AND USE

(71) Applicant: VICTREX MANUFACTURING LIMITED, Lancashire (GB)

(72) Inventors: Adam Chaplin, Lancashire (GB); Martin Riley, Lancashire (GB); Ulutan Tahsin, Lancashire (GB)

(73) Assignee: Victrex Manufacturing Limited, Lancashire (GB)

( * ) Notice: Subject to any disclaimer, the term of this patent is extended or adjusted under 35 U.S.C. 154(b) by 669 days.

(21) Appl. No.: 17/420,249

(22) PCT Filed: Jan. 6, 2020

(86) PCT No.: PCT/GB2020/050012
§ 371 (c)(1),
(2) Date: Jul. 1, 2021

(87) PCT Pub. No.: WO2020/141329
PCT Pub. Date: Jul. 9, 2020

(65) Prior Publication Data
US 2022/0064374 A1    Mar. 3, 2022

(30) Foreign Application Priority Data

Jan. 4, 2019 (GB) .................................. 1900140
Feb. 20, 2019 (GB) .................................. 1902310

(51) Int. Cl.
| | | |
|---|---|---|
| *C08G 65/40* | (2006.01) | |
| *B29C 64/153* | (2017.01) | |
| *B33Y 70/00* | (2020.01) | |
| *B33Y 10/00* | (2015.01) | |

(52) U.S. Cl.
CPC ........ *C08G 65/4012* (2013.01); *B29C 64/153* (2017.08); *B33Y 70/00* (2014.12); *C08G 65/4093* (2013.01); *B33Y 10/00* (2014.12); *C08G 2650/40* (2013.01)

(58) Field of Classification Search
USPC ....................................................... 528/126
See application file for complete search history.

(56) References Cited

U.S. PATENT DOCUMENTS

| | | |
|---|---|---|
| 4,717,761 A | 1/1988 | Staniland |
| 4,904,532 A | 2/1990 | Staniland |
| 5,730,925 A | 3/1998 | Mattes |
| 7,847,057 B2 | 12/2010 | Müller |
| 10,023,691 B2 | 7/2018 | Capra |
| 2006/0134419 A1 | 6/2006 | Monsheimer |
| 2009/0312454 A1 | 12/2009 | Leuterer |
| 2012/0114848 A1 | 5/2012 | Müller |
| 2017/0057163 A1 | 3/2017 | Chaplin et al. |

FOREIGN PATENT DOCUMENTS

| | | |
|---|---|---|
| EP | 2145913 A1 | 5/2009 |
| EP | 2123430 A1 | 11/2009 |
| GB | 2526243 A | 11/2015 |
| GB | 2542704 A | 3/2017 |
| WO | WO 2014/207458 A1 | 12/2014 |
| WO | WO 2015/124903 A1 | 8/2015 |

OTHER PUBLICATIONS

International Search Report and Written Opinion for PCT/GB2020/050012, dated Mar. 9, 2020 (9 pages).
GB Search Report for Application No. GB1900140.3, dated Jul. 5, 2019 (4 pages).
GB Search Report for Application No. GB2000090.7, dated Jun. 23, 2020 (2 pages).

*Primary Examiner* — Terressa Boykin
(74) *Attorney, Agent, or Firm* — Casimir Jones, S.C.; Anne M. Reynolds (57) ABSTRACT

A polyaryletherketone, PAEK, in the form of particles is a copolymer with at least 95 mole % repeat units of formula I, and repeat units of formula II, and a molar ratio I:II from 55:45 to 80:20. The PAEK has a melt viscosity, MV, from 0.35 to 0.55 $kNsm^{-2}$ at 1000 $s^{-1}$. The PAEK is of use in formation of components having high elongation at break when formed by selective sintering and melt-bonding of sequentially deposited layers of powder comprising the PAEK particles. Also provided are processes for making the PAEK particles, powders including them and their use and methods of their use in component formation.

20 Claims, 1 Drawing Sheet

POLYMERIC MATERIAL, MANUFACTURE AND USE

CROSS-REFERENCE TO RELATED APPLICATIONS

This application is a U.S. national stage application filed under 35 U.S.C. § 371 of International Patent Application No. PCT/GB2020/050012, filed on Jul. 9, 2020, which claims the benefit of United Kingdom Patent Application Serial No. 1900140.3, filed on Jan. 4, 2019, and United Kingdom Patent Application Serial No. 1902310.0, filed on Feb. 20, 2019, each of which is incorporated by reference herein in its entirety.

TECHNICAL FIELD

The invention relates to polymeric materials, in the form of particles, which are suitable for use in the formation of components by selective sintering and melt-bonding of sequentially deposited layers of powder comprising the particles. The invention also relates to processes for making the polymeric particles and methods of their use in component formation.

BACKGROUND

Methods in which rapid manufacturing of components is carried out from construction data under computer control are sometimes referred to as rapid prototyping methods. In prior art methods the component to be manufactured is built layer-wise from a building material. In some prior art methods, the building material is in powder form, with the uppermost layer of powder selectively sintered, for instance by selective heating with a laser, in order to melt-bond powder particles together, and to melt bond them to the layer on which they are deposited, in order to form a melt-bonded cross sectional layer of the component.

Such methods were, for example, known under the names 3D laser sintering, 3D laser melting or 3D printing. Metals, ceramics and plastics may be used as powdered building materials. For instance, the U.S. Pat. No. 5,730,925 describes a laser sintering method, in which layers of a powder are applied onto a support that can be vertically repositioned and in which the layers are selectively sintered at the positions corresponding to the cross-section of the object to be manufactured by means of a laser.

Originally, such methods were limited to prototyping, but now the methods are used for component manufacture. In this specification, such methods will be referred to by the term additive layer manufacturing (ALM), indicating that 3D parts are constructed by the build up of successive layers. This may be contrasted with traditional manufacturing by milling, in which material is removed or "subtracted" from a starting blank in order to arrive at a desired component shape.

Figure 1:
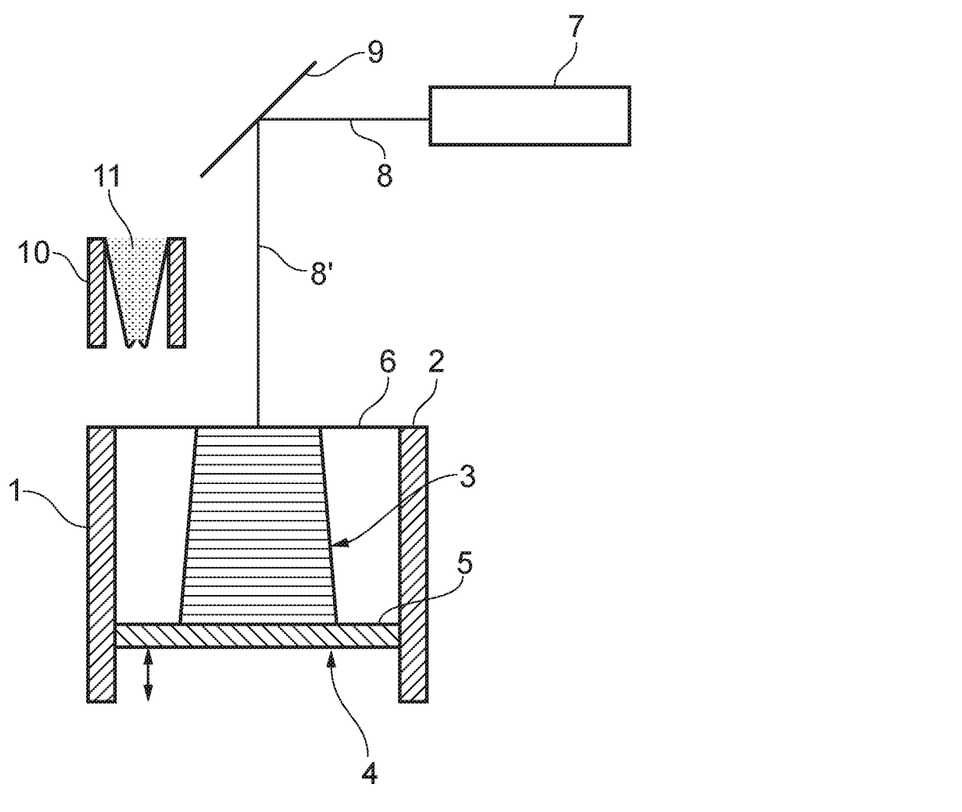
FIG. 1 shows a laser sintering device by means of which a method for a layer-wise manufacturing of a three-dimensional object may be performed using selective fusion of layers of a powder bed.

FIG. 1 shows a laser sintering device by means of which a method for a layer-wise manufacturing of a three-dimensional object may be performed using selective fusion of layers of a powder bed. The device comprises a container 1 which is open to the top and is limited at the bottom by a support 4 for supporting an object 3 to be formed. By the upper edge 2 of the container (or by its sidewalls) a work plane 6 is defined. The object is located on the top side of the support 4 and is formed from a plurality of layers of a building material in powder form that can be solidified by means of electromagnetic radiation, which layers are in parallel to the top side of the support 4. The support may be moved in a vertical direction via a height adjustment device so that the position of the support 4 relative to the work plane 6 can be adjusted.

Above the work plane 6, an application device 10 is provided for applying the powder material 11 to be solidified onto the support surface 5 or a previously solidified layer. Also, an irradiation device in the form of a laser 7, which emits a directed light beam 8, is arranged above the work plane 6. This light beam 8 is directed as deflected beam 8' towards the work plane 6 by a deflection device 9 such as a rotating mirror.

When the three-dimensional object 3 is manufactured, the powder building material 11 is applied layer-wise onto the support 4 or a previously solidified layer and is solidified at the positions of each powder layer that correspond to the object by means of the laser beam 8'. After each selective solidification of a layer, the support is lowered by the thickness of the powder layer to be subsequently applied.

Many modifications of processes and devices for manufacturing a three-dimensional object by selective sintering by means of electromagnetic radiation compared to the system described above exist, which can also be used. For example, instead of using a laser and/or a light beam, other systems to selectively deliver electromagnetic radiation could be used, such as mask exposure systems or the like.

A wide range of different types of polymeric materials has been proposed for use as building materials in ALM. Poly (aryletherketone) polymers, referred to herein as PAEK polymers, have been found to be particularly useful, as components that have been manufactured from PAEK powder or PAEK granulates are typically characterized by a low flammability, good biocompatibility as well as a high resistance against hydrolysis and radiation. It is the thermal resistance also at elevated temperatures as well as the chemical resistance that distinguishes PAEK powders from conventional polymer powders such as polyamides, polyesters and the like.

The high performance characteristics of PAEK polymers, combined with their low density, make them of use in the aerospace industry, in the automotive industry, in the electronic industry and in the medical industry.

U.S. Pat. No. 7,847,057 sets out to improve the properties of PAEK powders, as ALM building materials, to improve uniformly and evenness of an applied layer to improve accuracy of manufacturing of parts by laser sintering. The publication refers to polyaryletherketones and makes reference to the group consisting of polyetheretherketone (PEEK), polyetherketoneketone (PEKK), polyetherketone (PEK), polyetheretherketoneketone (PEEKK) and polyetherketoneetherketoneketone (PEKEKK). PEEK is the polymer used in the Examples of this patent.

Patent application publication EP2123430A seeks to address the problem of providing an improved process for producing an object by selective sintering which leads to improved mechanical properties. The problem is said to be solved by producing objects having a specific range of crystallinity and the publication says "the advantages of the invention are particularly feasible when polyaryletherketone polymer or a polyaryletherketone copolymer, or when a polyamide polymer or a polyamide copolymer is appropriately used as a polymer material of the polymer powder".

EP2145913A seeks to improve mechanical properties of objects manufactured by laser sintering of a polymer or copolymer, wherein the polymer or copolymer is modified by incorporation of branching groups in the polymeric backbone, modification of end groups, incorporation of bulky groups or providing "at least one aromatic group non-linearly linking the backbone chain". The publication includes a wide-ranging generic disclosure. However, its examples only describe a very small number of specific materials—e.g. "a structurally modified PAEK" (Example 1), a modified PEEK/PEK copolymer (Example 2), a powder based on polyamide PA6-3-T (Example 3), structurally modified polyethylene PE-LLD (Example 4), structurally modified polyethylene PE-HD (Example 5) and thermally treated PEEK (Examples 6 & 7).

Patent application publication US2006/0134419A discloses a polymer powder containing polyaryletherketone. The wide-ranging generic disclosure focuses on polyaryletherketones selected from PEEK, PEK, PEKK and PEEKK although the only polymer specifically exemplified is PEEK.

Patent application WO 2014/207458A1 discloses PEEK/PEDEK copolymers, which have repeat units EEK=—O-Ph-O-Ph-CO-Ph- and EDEK=—O-Ph-Ph-O-Ph-CO-Ph- in a molar proportion from 55:45 to 95:5 and with melt viscosity (MV) measured at 340° C. and 1000 s$^{-1}$ shear rate of at least 0.25 and less than 1.2 kNsm$^{-2}$. The copolymers are recommended as polymers with high performance similar to PEEK but with reduced melt temperature, high glass transition temperature and high crystallinity. The tensile strength of the polymeric material in conventionally moulded form is preferably at least 80 MPa.

Patent application WO 2015/124903A1 discloses the use of PEEK/PEDEK copolymer as a polymeric powder building material for ALM, with an EEK/EDEK molar ratio from 55:45 to 95:5 and an MV of at least 0.25 and less than 1.2 measured at 340° C. and at 1000 s$^{-1}$ shear rate. In the Examples of WO 2015/124903A1 the PEEK/PEDEK is prepared having an MV of 0.26 kNsm$^{-2}$, measured at 340° C. and at 1000 s$^{-1}$ shear rate, using a nucleophilic process employing 0.628 kg of diphenylsulfone as aromatic sulfone solvent per mole of the mixture of benzene-1,4-diol and 4,4'-biphenol. The MV for such a polymer measured at 400° C. and 1000 s$^{-1}$ would be lower, with a value of about 0.21 kNsm$^{-2}$. The molar ratio K/Na used in the process was 0.04. The tensile strength exhibited by test pieces formed by laser sintering (ALM) of the PEEK/PEDEK powder was about 58 MPa with 2% elongation at break and a modulus indicated to be 3 MPa as assessed by ISO 527. It is believed that the value indicated may have erroneously used the units MPa—the value should probably have been indicated as 3 GPa.

Components made by ALM using PAEK polymer particles as building material are typically lower in strength and higher in porosity than components made by injection moulding of the same PAEK. Moreover, the PAEKs which provide components with greater mechanical strength typically have a high melting point, making their use in ALM by selective laser sintering more difficult than for building materials with lower melting points.

SUMMARY

It is an object of the invention to address one or more of the above described problems.

One aim of the invention, amongst others, is to provide polymeric particles of PAEK which can be used as building materials in ALM (such as selective laser sintering) to generate components which have improved mechanical properties compared to prior art PAEK, for instance having greater elongation at break and/or a greater tensile strength. It is another aim to provide such polymeric particles having a relatively lower melting point than prior art particles providing similar mechanical properties. It is further aim of the invention to provide polymeric particles which are flowable at low shear rates when molten so that efficient melt-bonding between the particles may be achieved. It is further aim of the invention to provide polymeric particles which have a high bulk density.

The inventors have found that by use of a specific range for the ratio of EEK (—O-Ph-O-Ph-CO-Ph-) to EDEK (—O-Ph-Ph-O-Ph-CO-Ph-) repeat units, in a PEEK/PEDEK copolymer with 1,4 para linking, combined with a narrow melt viscosity, MV, range for the copolymer, particles of the selected copolymer, when used as a building material for ALM (such as selective laser sintering), result in formation of components which have improved tensile toughness and tensile strength, in particular with improved extension at break. It has also been surprisingly found that the selected polymer may exhibit a relatively low melt viscosity at low shear rates, compared to prior art polymers, such that melt-bonding may be improved. It has also been surprisingly found that the selected polymer may exhibit a high bulk density, which may be linked to good flowability in solid particulate form, which may lead to reduced porosity in the components formed by ALM, such as selective laser sintering, from the particles of the selected copolymer used as a building material. The polymers of the invention also have a lower melting point than conventional homopolymers such as PEK and PEEK used for ALM.

DETAILED DESCRIPTION

According to a first aspect of the invention, there is provided a polyaryletherketone, PAEK, in the form of particles for use in layer-wise formation of a component by selective sintering, wherein the PAEK is a copolymer comprising repeat units of formula and
repeat units of formula wherein at least 95 mol % of the copolymer repeat units are repeat units of formula I and of formula II;
wherein the repeat units I and II have a molar ratio 1:11 from 55:45 to 80:20; and
wherein the PAEK has a melt viscosity, MV, from 0.35 to 0.55 kNsm$^{-2}$ as measured using capillary rheometry at 400° C. at a shear rate of 1000 s$^{-1}$ by extrusion through a tungsten carbide capillary die of 0.5 mm diameter and 8.0 mm length.

For the sake of conciseness, units of formula I and formula II are referred to as PEEK and PEDEK respectively in this specification. Typically, the polymer will also have end units of the polymer, which may be the same as the repeat units, but with a terminal OH or F group. However, the process for forming the polymer may include a separate end-capping step at completion of polymerisation, in which case separate monomer or reagent may be added as end-capping agent so that the end units may differ from the repeat units of the polymer. Such end-capping is well known in the field of nucleophilic polycondensation reactions.

In other words, for the polymer of the invention, 95 mol % or more of all repeat units present are units of formula I and of formula II in the specified molar ratio 1:11 from 55:45 to 80:20. This may be established by virtue of knowledge of the numbers of moles of monomers employed in in the preparation of the polymer.

The phenylene moieties in each repeat unit I and II have 1,4-para linkages to atoms to which they are bonded. This results in the polymeric material being crystalline in nature.

Preferably, the MV of the PAEK of the first aspect of the invention, measured at 1000 s$^{-1}$ and at 400° C. as described above is from 0.40 to 0.50 kNsm$^{-2}$.

Preferably, the molar ratio 1:11 is from to 60:40 to 75:25.

Preferably, at least 98 mol % of the copolymer repeat units are repeat units of formula I and of formula II, more preferably 99 mol %. Most preferably, the polymer consists essentially of repeat units of formula I and formula II.

In this context, the term "consists essentially of" means that the no other monomers are deliberately included, although some may be present as unavoidable impurities or as end groups.

For this first aspect of the invention, the PAEK is in the form of particles, by which it is to be understood that the particles of this first aspect of the invention consist essentially of the specified PAEK polymer. In other words, aside from the PAEK polymer, the particles will typically comprise solely residues or impurities remaining from the process resulting in the formation of the PAEK particles.

The terms "consisting essentially of or" consists essentially of mean including the components specified but excluding other components except for materials present as impurities, such as unavoidable materials present as a result of processes used to provide the components, and components added at low levels, such as 1% by weight or less, added for some purpose other than achieving the technical effect of the invention.

The terms "consisting of" or "consists of" mean including the components specified but excluding other components.

Whenever appropriate, depending upon the context, the use of the terms "comprises" or "comprising" may also be taken to also include within the described scope the meanings "consists essentially of" or "consisting essentially of" and "consists of or" "consisting of".

Preferably, the PAEK of the first aspect of the invention may be a PAEK such that the ratio of the copolymer melt viscosity measured at a shear rate of 100 s$^{-1}$ to the copolymer melt viscosity measured at a shear rate of 10,000 s$^{-1}$ is from 6.0 to 9.0, with the melt viscosity at each shear rate measured using capillary rheometry at 400° C. by extrusion through a tungsten carbide capillary die of 0.5 mm diameter and 8.0 mm length.

As is explained below, this relatively low degree of shear thinning behaviour, as compared to prior art PAEKs, may be achieved for the PAEK copolymer of the invention by means of the use of a molar ratio of potassium carbonate to sodium carbonate such as from 0.002 to 0.030, for instance from 0.002 to 0.010, preferably from 0.002 to 0.004 when manufacturing the PAEK by nucleophilic polycondensation. Without wishing to be bound by any theory, it is believed that this leads to the resulting PAEK having a relatively low degree of chain branching which results in reduced melt viscosity at low shear rate compared to prior art copolymer of comparable molecular mass.

As another manifestation of the low branching of the PAEK copolymer of the first aspect of the invention, the copolymer may exhibit a polydispersity index PDI=$M_W/M_N$, based on polystyrene equivalent molecular masses, of less than 2.5, wherein $M_w$=weight average molecular mass and $M_n$=number average molecular mass.

PDI has a value equal to or greater than 1, with the value approaching 1 if all polymer chains in a sample are of uniform chain length.

For some addition polymerization mechanisms, dispersity can be as high as 10 or more. However, for typical step growth polymerization of linear polymers carried out in batch reactors, most probable values of dispersity are around 2.6. Carothers' equation limits dispersity/PDI for linear polymers formed by step-growth from 2 monomers to minimum value of 2.

However, for branched polymers, the modified Carothers' equation leads to values in excess of 2, and in practice, for PAEKs formed by nucleophilic polycondensation, typical value considerably in excess of 2 are found in the prior art, indicating that conventional nucleophilic polycondensation leads to branching of the PEEK/PEDEK PAEK copolymers formed using prior art methods.

Surprisingly, the inventors have been able to generate PEEK/PEDEK PAEK copolymers with low degrees of branching in which the molecular mass dispersity (PDI) approaches the minimum theoretical value of 2 for the polymer generated by the process.

The PAEK copolymer of the first aspect of the invention may have a PDI of less than 2.6, preferably less than 2.5, more preferably less than 2.4, even more preferably less than 2.3, most preferably less than 2.2.

The PAEK copolymer of the first aspect of the invention typically has a PDI of 2.0 or more.

The molecular mass dispersity, or polydispersity index, PDI, may suitably be measured as follows. A sample solution is prepared by dissolving 40 mg of the copolymer powder in 2 ml of 4-chlorophenol (PCP) at 205° C. The solution is then cooled, diluted to 20 ml with chloroform and filtered through a 0.45 µm PTFE syringe filter before analysis.

| Gel permeation chromotography conditions: | |
|---|---|
| Columns | 2× Agilent PLGel Mixed B, 300 × 7.8 mm |
| Solvent | 10% w/v PCP in chloroform |
| Flow rate | 1.0 ml/min |
| Temperature | 35° C. |
| Detector | Refractive index |

The data may be collected and analysed using Viscotek Omnisec 5.1 software. The system may be calibrated using Agilent Easi Cal polystyrene standards. All molecular mass results reported are expressed as 'polystyrene equivalent' molecular masses.

The PAEK copolymers of the present invention, measured by this route, have a far lower dispersity (PDI), i.e. a far narrower distribution of molecular mass, in comparison with prior art PAEK copolymers. Indeed, the PAEK copolymers of the present invention may exhibit PDIs that approach a lowest PDI of 2.0.

It will be understood that the PAEK copolymer of the invention is expected to be a statistical or random copolymer, rather than a block copolymer, as a consequence of the manufacturing method (nucleophilic polycondensation) used for its formation.

The PAEK copolymer of the invention may comprise residual impurities of aromatic sulfone solvent, particularly diphenylsulfone, sodium salt and 4,4'-difluorobenzophenone, from its formation by nucleophilic polycondensation.

The PAEK particles of the first aspect of the invention may suitably have a bulk density of 320 kg/m$^3$ or more, preferably 350 kg/m$^3$ or more. The bulk density may be measured in accordance with ASTM D 1895 method B.

Without wishing to be bound by any theory, it is thought that the use of a relatively low level of aromatic sulfone solvent in the nucleophilic polycondensation reaction used to manufacture the PAEK copolymer of the invention results in high level of polymer in the reaction product, so that when the solvent and other residual impurities are leached out of the remaining polymer, the remaining polymer has a relatively low internal pore volume compared to prior art PAEK polymer particles, and this in turn may lead to a relatively higher bulk density than would be achievable for PAEK particles manufactured by prior art methods employing higher levels of aromatic sulfone solvent. Hence, higher bulk densities may be achieved by use of aromatic sulfone solvent (such as diphenyl sulfone) being present in the reaction mixture as 0.27 to 1.02 kg/mole of the mixture of benzene-1,4-diol and 4,4'-biphenol present in the reaction mixture, as explained below. More preferably, higher bulk densities may be achieved by use of aromatic sulfone solvent (such as diphenyl sulfone) being present in the reaction mixture as 0.27 to 0.82 or even more preferably, as 0.27 to 0.70 kg/mole, or 0.27 to 0.39 of the mixture of benzene-1,4-diol and 4,4'-biphenol present in the reaction mixture, as explained below.

The bulk density of the PAEK polymer particles may be measured for the particles resulting from comminution and optional classification of the purified reaction product, prior to any tempering aimed at further increasing the bulk density by smoothing the particles.

For instance, the particles may be tempered by being held at a temperature from 250° C. to 300° C. for at least 30 minutes, preferably 1 hour or longer, more preferably 2 hours or longer prior to use for ALM. Such tempering may be applied after the manufacture, purification, drying comminution and optional classification steps discussed below. Such an additional tempering step may be employed to provide a further increase in Bulk Density prior to use of the polymer particles for ALM.

Suitably, the PAEK particles of the first aspect of the invention may have a median diameter D50, such that 50% by volume of the particles have a diameter less than D50, wherein D50 is from 20 to 120 µm, preferably from 35 to 70 µm.

Suitably, the PAEK particles of the first aspect of the invention may have a D90, such that 90% by volume of the particles have a diameter less than D90, wherein D90 is 300 µm or less, preferably 150 µm or less, such as from 100 to 150 µm.

Suitably, the PAEK particles of the first aspect of the invention may have a D10, such that 10% by volume of the particles have a diameter less than D10, wherein D10 is 10 µm or more, such as from 10 to 30 µm.

Such powder size characteristics allow for good flow of the powder in combination with the ability to provide relatively high resolution shaping of the component formed from the powder as building material using ALM.

A suitable method for measuring particle size distribution for the powder is by dynamic light scattering analysis using an apparatus such as a Micromeritics Saturn Digisizer 5200. The powder may be dispersed in a suitable dispersant solution such as 6.7 g sodium hexametaphosphate and 1.3 g sodium hydrogen carbonate dissolved in 2l deionised water, with the particle size distribution measured on a dilute dispersion. The volume distribution of the particles is used as basis for establishing D10, D50 and D90, but it will be understood that this is equivalent to D10, D50 and D90 based on a weight distribution. In order to derive a weight distribution from dynamic light scattering data, it is necessary to assume a uniform density for all particles measured, as the apparatus software derives weights and volumes for the particles based upon their cross sectional area as measured, assuming that the particles are spherical.

A preferred embodiment of the first aspect of the invention provides a polyaryletherketone, PAEK, in the form of particles, for use in layer-wise formation of a component by selective sintering, wherein the PAEK is a copolymer comprising repeat units of formula and
repeat units of formula wherein at least 95 mol % of the copolymer repeat units are repeat units of formula I and of formula II;
wherein the repeat units I and II have a molar ratio 1:11 from 60:40 to 75:25; and
wherein the PAEK has a melt viscosity, MV, from 0.40 to 0.50 kNsm$^{-2}$ as measured using capillary rheometry at 400° C. at a shear rate of 1000 s$^{-1}$ by extrusion through a tungsten carbide capillary die of 0.5 mm diameter and 8.0 mm length.

The particles of the PAEK consist essentially of the PAEK polymer, as explained above.

Preferably for this embodiment, the ratio of the copolymer melt viscosity measured at a shear rate of 100 s$^{-1}$ to the copolymer melt viscosity measured at a shear rate of 10,000 s$^{-1}$ is from 6.0 to 9.0, with the melt viscosity at each shear rate measured using capillary rheometry at 400° C. by extrusion through a tungsten carbide capillary die of 0.5 mm diameter and 8.0 mm length. More preferably, the PAEK particles also have a bulk density of 320 kg/m$^3$ or more.

According to a second aspect of the invention, there is provided a powder for use in a method for layer-wise formation of a component, the powder comprising from 60 to less than 100% by weight of the PAEK particles according to the first aspect of the invention and comprising other particles at up to 40% by weight.

The other particles may be ingredients such as:
other polymer particles, for instance particles of other PAEK polymers
filler particles
flow aid particles
radiation absorber Preferably, the powder of the second aspect of the invention comprises no PAEK polymer particles other than the PAEK polymer particles of the first aspect of the invention.

Preferred embodiments of the first aspect of the invention are also preferred as the PEAK polymer particles for this third aspect of the invention.

Filler particles may be fibrous filler and/or non-fibrous filler. When fibrous, the fibres suitably have a longest dimension of 300 μm or less. When non-fibrous, the filler particles suitably have D50, D90 and D10 as previously set out for the PAEK polymer particles of the first aspect of the invention.

Fibrous filler may be selected from inorganic fibrous materials, organic fibrous materials, such as aramid fibres, and carbon fibre. Preferably, the melting temperature for the fibrous filler should be at least 450° C.

Fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

Non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, ceramic powder, metal powder, flame retardant powder, nanotubes and barium sulfate. Non-fibrous fillers may be introduced in the form of powder or flake particles.

Mixtures of fillers may be employed. Some fillers may also act as radiation absorbers and/or as flow-aids.

Suitable radiation absorbers include carbon black, copper hydroxide phosphate (CHP), chalk, animal charcoal, carbon fiber, graphite, flame retardant, interference pigments and mixtures thereof. Suitable radiation absorbers may be particles having a median diameter of 1 μm or less such that they tend to coat the other particles of the powder.

Suitable flow aids will typically be particles of having a median diameter of 1 μm or less such that they tend to coat the other particles of the powder, smoothing their surfaces to reduce interparticle friction. Suitable flow aids are fumed silicas such as Aerosil®.

A third aspect of the invention provides a powder for use in a method for layer-wise formation of a component, the powder comprising from 90 to 100% by weight of first particles, each first particle comprising from 60 to less than 100% by weight of a polyaryletherketone, PAEK, and comprising one or more other ingredients at up to 40% by weight, and the powder further comprising from 0 to 10% by weight of other particles, wherein the PAEK is a copolymer comprising repeat units of formula

I and
repeat units of formula

II wherein at least 95 mol % of the copolymer repeat units are repeat units of formula I and of formula II;
wherein the repeat units I and II have a molar ratio 1:11 from 55:45 to 80:20, preferably from 60:40 to 75:25; and
wherein the PAEK has a melt viscosity, MV, from 0.35 to 0.55 kNsm$^{-2}$ as measured using capillary rheometry at 400° C. at a shear rate of 1000 s$^{-1}$ by extrusion through a tungsten carbide capillary die of 0.5 mm diameter and 8.0 mm length.

Preferably the MV of the PAEK at 400° C. and a shear rate of 1000 s$^{-1}$ is from 0.40 to 0.50 kNsm$^{-2}$.

It will thus be understood that the PAEK copolymer in this third aspect of the invention is the same PAEK copolymer as that of the particles of the first aspect of the invention, but in this third aspect of the invention, the first particles comprise both the PAEK copolymer and also up to 40% of other ingredients. Preferred PAEK copolymers of the first aspect of the invention are also preferred for this third aspect of the invention.

For instance, the first particles of the powder of the third aspect third may comprise 60 to 99.9% by weight of the PAEK copolymer (the weight of the PAEK copolymer including any unavoidable impurities therein) and from 0.1 to 40% by weight of other ingredients.

The other ingredients, and the other particles, if present, may be ingredients such as:
other polymer, for instance other PAEK polymers
filler
flow aid
radiation absorber.

Preferably, the powder of the third aspect of the invention comprises no PAEK polymer other than the PAEK polymer of the first aspect of the invention.

Preferred embodiments of PAEK polymer for the first aspect of the invention are also preferred as the PAEK polymer for this third aspect of the invention.

Filler may be fibrous filler and/or non-fibrous filler. When fibrous, the fibres suitably have a longest dimension of 300 μm or less. When non-fibrous, the filler particles suitably have D50, D90 and D10 as previously set out for the PAEK polymer particles of the first aspect of the invention.

Fibrous filler may be selected from inorganic fibrous materials, organic fibrous materials, such as aramid fibres, and carbon fibre. Preferably, the melting temperature for the fibrous filler should be at least 450° C.

Fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

Non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, ceramic powder, metal powder, flame retardant powder, nanotubes and barium sulfate. Non-fibrous fillers may be introduced in the form of powder or flake particles.

Mixtures of fillers may be employed. Some fillers may also act as radiation absorbers and/or as flow-aids.

Suitable radiation absorbers include carbon black, copper hydroxide phosphate (CHP), chalk, animal charcoal, carbon fiber, graphite, flame retardant, interference pigments and mixtures thereof. Suitable radiation absorbers may be particles having a median diameter of 1 μm or less such that they tend to coat the other particles of the powder.

Suitable flow aids will typically be particles of having a median diameter of 1 μm or less such that they tend to coat the other particles of the powder, smoothing their surfaces to reduce interparticle friction. Suitable flow aids are fumed silicas such as Aerosil®.

A fourth aspect of the invention provides use of PAEK in the form of particles, according to the first aspect of the invention, or a powder according to the second or third aspects of the invention in a process for formation of a component in a layer-wise fashion by sequentially depositing and sequentially sintering a plurality of layers of the PAEK particles or powder.

Suitably, a first layer of deposited PAEK particles or powder may be selectively sintered to melt-bond particles of the first layer to other particles of the first layer form a base layer of the component; and each subsequently deposited layer of PAEK particles or powder may be selectively sintered to melt-bond particles of the subsequently deposited layer to the respective preceding layer, and to other particles of the subsequently deposited layer, prior to deposition of a next deposited PAEK particle or powder layer. The component is formed from the selectively sintered and mutually melt-bonded portions of the plurality of layers corresponding to respective cross-sections of the component.

It will be understood that melt-bonding may be achieved by melting the PAEK polymer in the particles or powder.

A fifth aspect of the invention provides a method for manufacturing a component, the method comprising:

(i) selecting PAEK, in the form of particles, according to the first aspect of the invention or a powder according to second or third aspects of the invention; and

(ii) forming the component in a layer-wise fashion by sequentially depositing and sequentially sintering a plurality of layers of the PAEK particles or powder;

wherein a first layer of deposited PAEK particles or powder is selectively sintered to melt-bond particles of the first layer to other particles of the first layer to form a base layer of the component; and each subsequently deposited PAEK particle or powder layer is selectively sintered to melt-bond particles of the subsequently deposited layer to the respective preceding layer, and to other particles of the subsequently deposited layer, prior to deposition of a next deposited PAEK particle or powder layer;

whereby the component is formed from the selectively sintered and mutually melt-bonded portions of the plurality of layers corresponding to respective cross-sections of the component.

A sixth aspect of the invention provides a process for forming a polyaryletherketone, PAEK, in the form of particles for use in a method for layer-wise formation of a component, wherein the PAEK is a copolymer comprising repeat units of formula and
repeat units of formula wherein Ph represents a phenylene moiety;
the process comprising:
a) nucleophilic polycondensation of a mixture of benzene-1,4-diol and 4,4'-biphenol in a molar ratio of benzene-1,4-diol: 4,4'-biphenol from 55:45 to 80:20, with 4,4'-dihalobenzophenone in a reaction mixture comprising sodium carbonate and potassium carbonate in an aromatic sulfone solvent, at a reaction temperature rising to a temperature from 280° C. to 330° C.;
b) cooling of the resulting reaction mixture and recovery of the PAEK copolymer resulting from step from the reaction mixture;
c) forming the recovered PAEK copolymer into particles;
wherein in step a of the process:
i the molar ratio of sodium carbonate to the mixture of benzene-1,4-diol and 4,4'-biphenol is from 0.95 to 1.15;
ii the molar ratio of potassium carbonate to sodium carbonate is from 0.002 to 0.050;
iii the molar ratio of the 4,4'-dihalobenzophenone to the mixture of benzene-1,4-diol and 4,4'-biphenol is from 1.01 to 1.03;
iv the aromatic sulfone solvent is present in the reaction mixture as 0.27 to 0.48 kg/mole of the mixture of benzene-1,4-diol and 4,4'-biphenol; and
v the polycondensation in step a is continued for sufficient time to ensure that the resulting PAEK recovered from step a has a melt viscosity, MV, from 0.35 to 0.55 kNsm$^{-2}$ as measured using capillary rheometry at 400° C. at a shear rate of 1000 s$^{-1}$ by extrusion through a tungsten carbide capillary die of 0.5 mm diameter and 8.0 mm length.

One suitable way to monitor the progress of polycondensation in step a is to measure the torque of a stirrer used to stir the mixture during step a. By carrying out a simple set of trials, using varying polycondensation times for a particular polycondensation temperature, it is straightforward to establish how long is needed to achieve the desired MV for the eventually recovered PAEK. Such methods for monitoring nucleophilic polycondensation of PAEK polymers are well known in the art.

In a preferred process of the sixth aspect of the invention, the polycondensation in step a is continued for sufficient time to ensure that the resulting PAEK recovered from step a has a melt viscosity, MV, from 0.40 to 0.50 kNsm$^{-2}$ as measured using capillary rheometry at 400° C. at a shear rate of 1000 s⁻¹ by extrusion through a tungsten carbide capillary die of 0.5 mm diameter and 8.0 mm length.

In a preferred process of the sixth aspect of the invention, the molar ratio of benzene-1,4-diol:4,4'-biphenol is from 60:40 to 75:25.

Preferably, the aromatic sulfone solvent is present in the reaction mixture as 0.27 to 0.39 kg/mole of the mixture of benzene-1,4-diol and 4,4'-biphenol. Without wishing to be bound by theory, the use of a level of aromatic sulfone solvent within this range of kg/mole is thought to increase the bulk density of the PAEK particles resulting from the process, consequently improving the density of components subsequently formed from the particles by ALM.

The aromatic sulfone solvent used in the process may suitably be a solvent of formula where W is a direct link, an oxygen atom or two hydrogen atoms (one attached to each benzene ring) and Z and Z', which may be the same or different, are hydrogen atoms or phenyl groups. A mixture of such solvents may be used. Examples of such aromatic sulfones include diphenylsulfone, dibenzothiophen dioxide, phenoxanthin dioxide and 4-phenylsulfonyl biphenyl. Diphenylsulfone is a preferred solvent. Step a of the process is preferably carried out in the presence of diphenylsulfone as solvent. Preferably, the aromatic sulfone solvent comprises 95% by weight or more of diphenylsulfone. More preferably, the aromatic sulfone solvent consists essentially of diphenylsulfone, by which it is meant that the solvent comprises at least 95% by weight of diphenylsulfone, preferably at least 98% by weight, more preferably at least 99% by weight.

Preferably, the molar ratio of potassium carbonate to sodium carbonate in step a is from 0.002 to 0.030, for instance from 0.002 to 0.010, preferably from 0.002 to 0.004 when manufacturing the PAEK. It is thought that a value in this range provides controllable polymerisation without gel formation or excessive discolouration, yet gives a low level of branching in the resulting polymer compared to the use of higher levels of potassium. The resulting PAEK polymer may have a reduced viscosity at low shear rates, compared to a highly branched polymer of the same molecular weight (i.e. the same MV measured at 1000 s⁻¹) as a consequence of this low branching. In other words, the MV measured at 100 or 10 s⁻¹ is expected to be lower for a polymer produced using a low K/Na ratio than for a polymer made using a high K/Na ratio in step a of the process. This feature may be useful for PAEK particles for use in manufacture of components by ALM because the consolidation of particles which are melted in ALM results from the flow of molten polymer at low shear rates, and so a low viscosity at low shear rates is likely to increase the bulk density and reduce the porosity of the components made using the PAEK powder from the process.

Step a may include addition of a stopping agent in order to terminate the polymerisation. Such stopping agents are well known in the field, such as lithium chloride. Step a may also include end-capping in order to provide suitable end units to the resulting polymer.

Hence, a preferred embodiment of the sixth aspect of the invention provides a process for forming a polyaryletherketone, PAEK, in the form of particles for use in a method for layer-wise formation of a component, wherein the PAEK is a copolymer comprising repeat units of formula and
repeat units of formula wherein Ph represents a phenylene moiety;
the process comprising:
a) nucleophilic polycondensation of a mixture of benzene-1,4-diol and 4,4'-biphenol in a molar ratio of benzene-1,4-diol: 4,4'-biphenol from 60:40 to 75:25, with 4,4'-difluorobenzophenone in a reaction mixture comprising sodium carbonate and potassium carbonate in an aromatic sulfone solvent, at a reaction temperature rising to a temperature from 280° C. to 330° C.;
b) cooling of the resulting reaction mixture and recovery of the PAEK copolymer resulting from step from the reaction mixture;
c) forming the recovered PAEK copolymer into particles;
wherein in step a of the process:
i the molar ratio of sodium carbonate to the mixture of benzene-1,4-diol and 4,4'-biphenol is from 0.95 to 1.15;
ii the molar ratio of potassium carbonate to sodium carbonate is from 0.002 to 0.050; iii the molar ratio of the 4,4'-dihalobenzophenone to the mixture of benzene-1,4-diol and 4,4'-biphenol is from 1.01 to 1.03;
iv wherein the aromatic sulfone solvent consists essentially of diphenyl sulfone and is present in the reaction mixture as 0.27 to 0.48 kg/mole of the mixture of benzene-1,4-diol and 4,4'-biphenol; and
v the polycondensation in step a is continued for sufficient time to ensure that the resulting PAEK recovered from step a has a melt viscosity, MV, from 0.40 to 0.50 kNsm⁻² as measured using capillary rheometry at 400° C. at a shear rate of 1000 s⁻¹ by extrusion through a tungsten carbide capillary die of 0.5 mm diameter and 8.0 mm length.

Preferably, the molar ratio of potassium carbonate to sodium carbonate is from 0.002 to 0.004.

Specific embodiments of the invention will now be described by reference to the following Examples.

Example 1

A 400 L stainless steel reactor fitted with a lid, stirrer, nitrogen inlet and condenser was charged with diphenyl sulfone (93 kg) and heated to 160° C. Once the diphenyl sulfone had fully melted, hydroquinone (14.3 kg, 130 mol), 4,4'-diphenol (13.0 kg, 70 mol) and 4,4'-difluorobenzophenone (44.4 kg, 203.4 mol) were charged with stirring under a nitrogen atmosphere. The reactants were allowed to heat back up to 180° C. Dry sodium carbonate (22.0 kg, 207.5 mol) and dry potassium carbonate (0.069 kg, 0.5 mol) which had been sieved through a 500 μm mesh, were then added over a 15 minute period.

The contents were then heated back to 180° C. at 1° C./min while maintaining a nitrogen blanket and held for 100 minutes. The temperature was then raised to 200° C. at 1° C./min and held for 20 minutes. The temperature was further raised to 315° C. at 1° C./min and held until the desired molecular weight was reached, as determined by the torque rise of the stirrer. The reaction mixture was discharged via a band-caster to allow it to solidify, and then pulverised to form a coarse powder.

After cooling to room temperature, the crude polymer in coarse powder form was then washed with acetone (2.2 m$^3$) followed by water (3 m$^3$). The resulting polymer powder was dried in a circulating air oven to constant weight.

The resulting polymer had a Melt Viscosity (MV) of 0.36 kNsm$^{-2}$ at a temperature of 400° C. and a shear rate of 1000 s$^{-1}$, as measured by capillary rheometry as described below.

Example 2

A 400 L stainless steel reactor fitted with a lid, stirrer, nitrogen inlet and condenser was charged with diphenyl sulfone (75.6 kg) and heated to 160° C. Once the diphenyl sulfone had fully melted, hydroquinone (13.5 kg, 122 mol), 4,4'-diphenol (7.59 kg, 40.8 mol) and 4,4'-difluorobenzophenone (36.5 kg, 167.1 mol) were charged with stirring under a nitrogen atmosphere. The reactants were allowed to heat back up to 180° C. Dry sodium carbonate (17.9 kg, 169.1 mol) and dry potassium carbonate (0.056 kg, 0.41 mol) which had been sieved through a 500 μm mesh, were then added over a 15 minute period.

The contents were then heated back to 180° C. at 1° C./min while maintaining a nitrogen blanket and held for 100 minutes. The temperature was then raised to 200° C. at 1° C./min and held for 20 minutes. The temperature was further raised to 315° C. at 1° C./min and held until the desired molecular weight was reached as determined by the torque rise of the stirrer. The reaction mixture was discharged via a band-caster to allow it to solidify, and then pulverised to form a coarse powder.

After cooling to room temperature, the crude polymer in coarse powder form was then washed with acetone (2.2 m$^3$) followed by water (3 m$^3$). The resulting polymer powder was dried in a circulating air oven to constant weight.

The resulting polymer had a melt viscosity MV of 0.39 kNsm$^{-2}$ at a temperature of 400° C. and a shear rate of 1000 s$^{-1}$, as measured by capillary rheometry as set out below.

Example 3

A 400 L stainless steel reactor fitted with a lid, stirrer, nitrogen inlet and condenser was charged with diphenyl sulfone (93 kg) and heated to 160° C. Once the diphenyl sulfone had fully melted, hydroquinone (16.5 kg, 150 mol), 4,4'-diphenol (9.3 kg, 50 mol) and 4,4'-difluorobenzophenone (44.4 kg, 203.4 mol) were charged with stirring under a nitrogen atmosphere. The reactants were allowed to heat back up to 180° C. Dry sodium carbonate (21.4 kg, 202 mol) and dry potassium carbonate (1.1 kg, 8 mol) which had been sieved through a 500 μm mesh, were then added over a 15 minute period.

The contents were then heated back to 180° C. at 1° C./min while maintaining a nitrogen blanket and held for 100 minutes. The temperature was then raised to 200° C. at 1° C./min and held for 20 minutes. The temperature was further raised to 315° C. at 1° C./min and held until the desired molecular weight was reached as determined by the torque rise of the stirrer. The reaction mixture was discharged via a band-caster to allow it to solidify, and then pulverised to form a coarse powder.

After cooling to room temperature, the crude polymer was then washed with acetone (2.2 m$^3$) followed by water (3 m$^3$). The resulting polymer powder was dried in a circulating air oven to constant weight.

The resulting polymer had a melt viscosity of 0.45 kNsm$^{-2}$ at a temperature of 400° C. and a shear rate of 1000 s$^{-1}$, as measured by capillary rheometry as described below.

Example A (Comparative)

A 400 L stainless steel reactor fitted with a lid, stirrer, nitrogen inlet and condenser was charged with diphenyl sulfone (93 kg) and heated to 160° C. Once the diphenyl sulfone had fully melted, hydroquinone (16.5 kg, 150 mol), 4,4'-diphenol (9.3 kg, 50 mol) and 4,4'-difluorobenzophenone (44.7 kg, 205 mol) were charged with stirring under a nitrogen atmosphere. The reactants were allowed to heat back up to 180° C. Dry sodium carbonate (21.4 kg, 202 mol) and dry potassium carbonate (1.1 kg, 8 mol) which had been sieved through a 500 μm mesh, were then added over a 15 minute period.

The contents were then heated back to 180° C. at 1° C./min while maintaining a nitrogen blanket and held for 100 minutes. The temperature was then raised to 200° C. at 1° C./min and held for 20 minutes. The temperature was further raised to 315° C. at 1° C./min and held until the desired molecular weight was reached as determined by the torque rise of the stirrer. The reaction mixture was discharged via a band-caster to allow it to solidify, and then pulverised to form a coarse powder.

After cooling to room temperature, the crude polymer in coarse powder form was then washed with acetone (2.2 m$^3$) followed by water (3 m$^3$). The resulting polymer powder was dried in a circulating air oven to constant weight.

The resulting polymer had a melt viscosity MV of 0.33 kNsm$^{-2}$ at a temperature of 400° C. and a shear rate of 1000 s$^{-1}$, as measured by capillary rheometry as described below.

Example B (Comparative)

A 400 L stainless steel reactor fitted with a lid, stirrer, nitrogen inlet and condenser was charged with diphenyl sulfone (125 kg) and heated to 160° C. Once the diphenyl sulfone had fully melted, hydroquinone (16.5 kg, 150 mol), 4,4'-diphenol (9.3 kg, 50 mol) and 4,4'-difluorobenzophenone (44.7 kg, 205 mol) were charged with stirring under a nitrogen atmosphere. The reactants were allowed to heat back up to 180° C. Dry sodium carbonate (21.4 kg, 202 mol) and dry potassium carbonate (1.1 kg, 8 mol) which had been sieved through a 500 μm mesh, were then added over a 15 minute period.

The contents were then heated back to 180° C. at 1° C./min while maintaining a nitrogen blanket and held for 100 minutes. The temperature was then raised to 200° C. at 1° C./min and held for 20 minutes. The temperature was further raised to 315° C. at 1° C./min and held until the desired molecular weight was reached as determined by the torque rise of the stirrer. The reaction mixture was discharged via a band-caster to allow it to solidify, and then pulverised to form a coarse powder.

After cooling to room temperature, the crude polymer in coarse powder form was then washed with acetone (2.2 m³) followed by water (3 m³). The resulting polymer powder was dried in a circulating air oven to constant weight.

The resulting polymer had a melt viscosity MV of 0.21 kNsm$^{-2}$ at a temperature of 400° C. and a shear rate of 1000 s$^{-1}$, as measured by capillary rheometry as described below.

Capillary Rheometry

The melt viscosity of the PAEK copolymer may be measured by capillary rheometry using an RH10 capillary rheometer (Malvern Instruments Rosand RH10 capillary rheometer), fitted with a tungsten carbide die, 0.5 mm (capillary diameter)×8.0 mm (capillary length). Approximately 5 grams of the copolymer is dried in an air circulating oven for 3 hours at 150° C. The extruder is allowed to equilibrate to 400° C. The dried polymer is loaded into the heated barrel of the extruder, a brass tip (12 mm long× 9.92±0.01 mm diameter) placed on top of the polymer followed by the piston and the screw manually turned until the proof ring of the pressure gauge just engages the piston to help remove any trapped air. The column of polymer is allowed to heat and melt over a period of at least 10 minutes. After the preheat stage the screw was is in motion so that the melted polymer is extruded through the die to form a thin fibre at the desired shear rate, while recording the pressure (P) required to extrude the polymer. The Melt Viscosity is given by the formula $$\text{Melt Viscosity} = \frac{P\pi r^4}{8LSA} kNsm^{-2}$$

where P=Pressure/kN m$^{-2}$
L=Length of die/m
S=ram speed/m s$^{-1}$
A=barrel cross-sectional area/m²
r=Die radius/m The relationship between shear rate and the other parameters is given by the equation:

Apparent wall shear rate=$4Q/\pi r^3$ where Q=volumetric flow rate/m³ s$^{-1}$=SA.

Hence, by adjusting the ram speed, S, the viscosity of the molten polymer may be measured at different shear rates, such as at 100, 1000 or 10,000 s$^{-1}$.

Tensile Testing

An EOSINT P800 laser sintering system was used for ALM manufacture of tensile test components from the polymer particles. The system consists of two 50 W carbon dioxide lasers, a recoating mechanism, a heated piston, infrared lamps focused on the powder bed and a heated exchangeable frame.

The machine initially goes through a warm up stage where it gradually increases the temperature of the base powder to the process temperature within an inert gas atmosphere. After completion of the warm up stage, the machine starts the laser sintering build stage. During the laser sintering process, the particles are applied to the process bed by means of a recoating mechanism to give a layer thickness of 0.12 mm. The part contours are scanned by the carbon dioxide lasers and subsequently filled to complete the cross sectional layer of the CAD data. Once sintered, the material goes through a post-sintering stage where the particle layer is exposed to thermal radiation for a further 12 seconds during which the sintered powder grains finally flow to form a homogenous molten film. The piston then drops by the layer thickness and the recoating mechanism applies the next layer of powder. On completion of the build, the machine enters a cool down stage where it controls the cooling rate of the powder to room temperature. The particles which are not incorporated into the build (often referred to as "the cake") are removed. At room temperature the exchangeable frame is removed from the machine and the parts are cleaned of unused powder.

Test parts for tensile strength testing (according to ISO 527) were produced from the powder of the Examples by ALM, as described above, using 13.5 W laser power. The particles were milled and classified to have a D50 value of about 30-70 μm. Ultimate tensile properties of the test parts were assessed in accordance with ISO527.

The results for the Examples are summarised in Table 1.

TABLE 1

| Example | PEEK:PEDEK ratio | K:Na | MV (kNsm$^{-2}$) | TS (MPa) | E@B % |
|---|---|---|---|---|---|
| Ex1 | 65:35 | 0.0025 | 0.36 | — | — |
| Ex2 | 75:25 | 0.0025 | 0.39 | — | — |
| Ex3 | 75:25 | 0.040 | 0.45 | 79.1 | 7 |
| ExA (comp) | 75:25 | 0.040 | 0.30 | 68.1 | 3 |
| ExB (comp) | 75:25 | 0.040 | 0.21 | 57.0 | 2 |

TS = Tensile Strength
E@B = Elongation at break
MV = Melt Viscosity at 1000s$^{-1}$
K:Na = molar ratio K$_2$CO$_3$/Na$_2$CO$_3$ in step a of process

It is evident that the comparative PEEK/PEDEK copolymer of Example A with an MV of 0.30 kNsm$^{-2}$ provides tensile strength characteristics in ALM which are substantially poorer compared to the tensile strength characteristics in ALM of a polymer according to the present invention, with the same PEEK:PEDEK ratio of 75:25, but with a higher MV.

It was found that for polymer MV's in excess of 0.550 kNsm$^{-2}$, milling of the polymer to form a powder suitable for use in ALM was sufficiently difficult as to make it impractical.

Furthermore, improved mechanical properties of the printed test bars according to the present invention were obtained when the laser power of the sample was increased to 15 W or 16.5 W. It has been surprisingly found that an elongation at break of up to 17% is achievable for test parts produced from the powder of the Examples by ALM, as described above, using an increased laser power of up to 15 W or 16.5 W. The elongation at break measurements of the test parts formed using increased laser power were carried out in accordance with ISO 527.

It will be appreciated that numerous modifications to the above described embodiments may be made without departing from the scope of the invention as defined in the appended claims. For example, the K:Na ratio employed in making the polymer may be 0.003, or the MV of the polymer may be 0.49 kNsm$^{-2}$.

In summary, the invention provides a polyaryletherketone, PAEK, in the form of particles which is a copolymer with at least 95 mole % repeat units of formula and
repeat units of formula and a molar ratio 1:11 from 55:45 to 80:20. The PAEK has a melt viscosity, MV, from 0.35 to 0.55 kNsm$^{-2}$ at 1000 s$^{-1}$. The PAEK is of use in formation of components having high tensile strength and/or high elongation at break when formed by selective sintering and melt-bonding of sequentially deposited layers of powder comprising the PAEK particles. Also provided are processes for making the PAEK particles and methods of their use in component formation.

The described and illustrated embodiments are to be considered as illustrative and not restrictive in character, it being understood that preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim.

The invention claimed is:

1. A polyaryletherketone, PAEK, in the form of particles, for use in layer-wise formation of a component by selective sintering, wherein the PAEK is a copolymer comprising repeat units of formula and
repeat units of formula wherein at least 95 mol % of the copolymer repeat units are repeat units of formula I and of formula II;
wherein the repeat units I and II have a molar ratio I:II from 55:45 to 80:20; and
wherein the PAEK has a melt viscosity, MV, from 0.35 to 0.55 kNsm$^{-2}$ as measured using capillary rheometry at 400° C. at a shear rate of 1000 s$^{-1}$ by extrusion through a tungsten carbide capillary die of 0.5 mm diameter and 8.0 mm length; and
wherein the particles have a median diameter D50 from 20 to 120 μm.

2. A PAEK according to claim 1 wherein the MV is from 0.40 to 0.50 kNsm$^{-2}$.

3. A PAEK according to claim 1 wherein the molar ratio I:II is from to 60:40 to 75:25.

4. A PAEK according to claim 1 wherein the ratio of the copolymer melt viscosity measured at a shear rate of 100 s$^{-1}$ to the copolymer melt viscosity measured at a shear rate of 10,000 s$^{-1}$ is from 6.0 to 9.0, with the melt viscosity at each shear rate measured using capillary rheometry at 400° C. by extrusion through a tungsten carbide capillary die of 0.5 mm diameter and 8.0 mm length.

5. A PAEK according to claim 1 wherein the PAEK particles have a bulk density of 320 kg/m$^3$ or more.

6. A powder for use in a method for layer-wise formation of a component, the powder comprising from 60 to less than 100% by weight of the PAEK particles according to claim 1, and comprising other particles at up to 40% by weight.

7. A process for formation of a component in a layer-wise fashion, comprising depositing and sequentially sintering a plurality of layers of a polyaryletherketone, PAEK, in the form of a powder, the powder comprising from 90 to 100% by weight of first particles, each first particle comprising from 60 to less than 100% by weight of the PAEK, and comprising one or more other ingredients at up to 40% by weight, and the powder further comprising from 0 to 10% by weight of other particles, wherein the PAEK is a copolymer comprising repeat units of formula and
repeat units of formula wherein at least 95 mol % of the copolymer repeat units are repeat units of formula I and of formula II;
wherein the repeat units I and II have a molar ratio I:II from 55:45 to 80:20; and
wherein the PAEK has a melt viscosity, MV, from 0.35 to 0.55 kNsm$^{-2}$ as measured using capillary rheometry at 400° C. at a shear rate of 1000 s$^{-1}$ by extrusion through a tungsten carbide capillary die of 0.5 mm diameter and 8.0 mm length.

8. A process for formation of a component in a layer-wise fashion, comprising depositing and sequentially sintering a plurality of layers of the PAEK, in the form of particles, according to claim 1.

9. A method for manufacturing a component, the method comprising:
(i) selecting PAEK, in the form of particles, according to claim 1; and
(ii) forming the component in a layer-wise fashion by sequentially depositing and sequentially sintering a plurality of layers of the PAEK particles;
wherein a first layer of deposited PAEK particles is selectively sintered to melt-bond particles of the first layer to other particles of the first layer to form a base layer of the component; and
each subsequently deposited PAEK particle layer is selectively sintered to melt-bond particles of the subsequently deposited layer to the respective preceding layer, and to other particles of the subsequently deposited layer, prior to deposition of a next deposited PAEK particle layer;
whereby the component is formed from the selectively sintered and mutually melt-bonded portions of the plurality of layers corresponding to respective cross-sections of the component.

10. A process for forming a polyaryletherketone, PAEK, in the form of particles having a median diameter D50 from 20 to 120 μm, for use in a method for layer-wise formation of a component, wherein the PAEK is a copolymer comprising repeat units of formula

I and
repeat units of formula

II wherein Ph represents a phenylene moiety;
the process comprising:
a) nucleophilic polycondensation of a mixture of benzene-1,4-diol and 4,4'-biphenol in a molar ratio of benzene-1,4-diol: 4,4'-biphenol from 55:45 to 80:20, with 4,4'-difluorobenzophenone in a reaction mixture comprising sodium carbonate and potassium carbonate in an aromatic sulfone solvent, at a reaction temperature rising to a temperature from 280° C. to 330° C.;
b) cooling of the resulting reaction mixture and recovery of the PAEK copolymer resulting from step from the reaction mixture;
c) forming the recovered PAEK copolymer into particles having a median diameter D50 from 20 to 120 μm;

wherein in step a of the process:
i the molar ratio of sodium carbonate to the mixture of benzene-1,4-diol and 4,4'-biphenol is from 0.95 to 1.15;
ii the molar ratio of potassium carbonate to sodium carbonate is from 0.002 to 0.05;
iii the molar ratio of the 4,4'-dihalobenzophenone to the mixture of benzene-1,4-diol and 4,4'-biphenol is from 1.01 to 1.03;
iv the aromatic sulfone solvent is present in the reaction mixture as 0.27 to 1.02 kg/mole of the mixture of benzene-1,4-diol and 4,4'-biphenol; and
v the polycondensation in step a is continued for sufficient time to ensure that the resulting PAEK recovered from step a has a melt viscosity, MV, from 0.35 to 0.55 kNsm$^{-2}$ as measured using capillary rheometry at 400° C. at a shear rate of 1000 s$^{-1}$ by extrusion through a tungsten carbide capillary die of 0.5 mm diameter and 8.0 mm length.

11. A process according to claim 10 wherein the molar ratio of benzene-1,4-diol:4,4'-biphenol is from 60:40 to 75:25.

12. A process according to claim 10 wherein the aromatic sulfone solvent is present in the reaction mixture as 0.27 to 0.82 kg/mole of the mixture of benzene-1,4-diol and 4,4'-biphenol or 0.27 to 0.70 kg/mole of the mixture of benzene-1,4-diol and 4,4'-biphenol or 0.27 to 0.48 kg/mole of the mixture of benzene-1,4-diol and 4,4'-biphenol.

13. A process according to claim 10 wherein the aromatic sulfone solvent is present in the reaction mixture as 0.27 to 0.39 kg/mole of the mixture of benzene-1,4-diol and 4,4'-biphenol.

14. A process according to claim 10 wherein the aromatic sulfone solvent comprises at least 95% by weight of diphenylsulfone.

15. A process according to claim 10 wherein the molar ratio of potassium carbonate to sodium carbonate is from 0.002 to 0.004.

16. A process for formation of a component in a layer-wise fashion, comprising depositing and sequentially sintering a plurality of layers of the PAEK, in the form of a powder, according to claim 6.

17. A method for manufacturing a component, the method comprising:
(i) selecting PAEK, in the form of a powder, according to claim 6; and
(ii) forming the component in a layer-wise fashion by sequentially depositing and sequentially sintering a plurality of layers of the PAEK powder;
wherein a first layer of deposited PAEK powder is selectively sintered to melt-bond particles of the first layer to other particles of the first layer to form a base layer of the component; and
each subsequently deposited PAEK particle layer is selectively sintered to melt-bond particles of the subsequently deposited layer to the respective preceding layer, and to other particles of the subsequently deposited layer, prior to deposition of a next deposited PAEK powder layer;
whereby the component is formed from the selectively sintered and mutually melt-bonded portions of the plurality of layers corresponding to respective cross-sections of the component.

18. A process according to claim 7, wherein the repeat units I and II have a molar ratio I:II from 60:40 to 75:25.

19. A process according to claim 7, wherein the PAEK has a MV from 0.40 to 0.50 kNsm$^{-2}$.

20. A process according to claim 14, wherein the aromatic sulfone solvent consists essentially of diphenylsulfone.

\* \* \* \* \*